US010025925B2

(12) United States Patent
Carpenter et al.

(10) Patent No.: US 10,025,925 B2
(45) Date of Patent: Jul. 17, 2018

(54) DYNAMICALLY MEASURING THE INTEGRITY OF A COMPUTING APPARATUS

(71) Applicant: Adventium Enterprises, LLC, Minneapolis, MN (US)

(72) Inventors: Todd P. Carpenter, St. Paul, MN (US); Steven J. Johnston, New Hope, MN (US); Ian J. De Silva, Minneapolis, MN (US)

(73) Assignee: Adventium Enterprises, LLC, Minneapolis, MN (US)

( * ) Notice: Subject to any disclaimer, the term of this patent is extended or adjusted under 35 U.S.C. 154(b) by 273 days.

(21) Appl. No.: 14/747,322

(22) Filed: Jun. 23, 2015

(65) Prior Publication Data

US 2016/0379000 A1    Dec. 29, 2016

(51) Int. Cl.
*G06F 21/55* (2013.01)

(52) U.S. Cl.
CPC ................................. *G06F 21/552* (2013.01)

(58) Field of Classification Search
CPC ..................................................... G06F 21/552
USPC ............................................................ 726/17
See application file for complete search history.

(56) References Cited

U.S. PATENT DOCUMENTS

| 6,079,705 A * | 6/2000 | Skvoretz .......... G07B 17/00661 235/375 |
| 2013/0151860 A1* | 6/2013 | Walker .................. G06F 21/725 713/186 |
| 2015/0150127 A1* | 5/2015 | Ning ........................ G06F 21/57 726/22 |
| 2015/0199507 A1* | 7/2015 | Azab ........................ G06F 21/53 726/22 |

* cited by examiner

*Primary Examiner* — Kambiz Zand
*Assistant Examiner* — Benjamin Kaplan
(74) *Attorney, Agent, or Firm* — Brooks, Cameron & Huebsch, PLLC

(57) ABSTRACT

The present disclosure includes methods and systems for measuring the integrity of a device. A number of embodiments can include initiating an observatory in a system and initiating a remote manager. A number of embodiments can also include measuring the integrity of the device from the observatory and accessing the integrity measurement of the device from the remote manager.

19 Claims, 5 Drawing Sheets

DYNAMICALLY MEASURING THE INTEGRITY OF A COMPUTING APPARATUS

GOVERNMENT RIGHTS

This invention was made with Government support under Agreement FA8750-10-D-0197 awarded by the Air Force, Agreement W31P4Q13C0143 awarded by DARPA and the Army, and Agreement NNX15CL71P awarded by NASA. Accordingly, the U.S. Government has certain rights in this invention.

BACKGROUND

Computing systems can be exposed to a number of security issues and other threats such as radiation-induced faults in space-based systems. For example, a system can be exposed to malware, among various other security threats. Security threats may occur knowingly or unknowingly and can occur from within a particular system or remotely. As an example, malware can affect (e.g., harm) computational operations and/or can provide access to sensitive information, which can create various issues for companies and/or users. Malware can reproduce itself and can spread from one computer system to a number of other computer systems.

DETAILED DESCRIPTION

Figure 1:
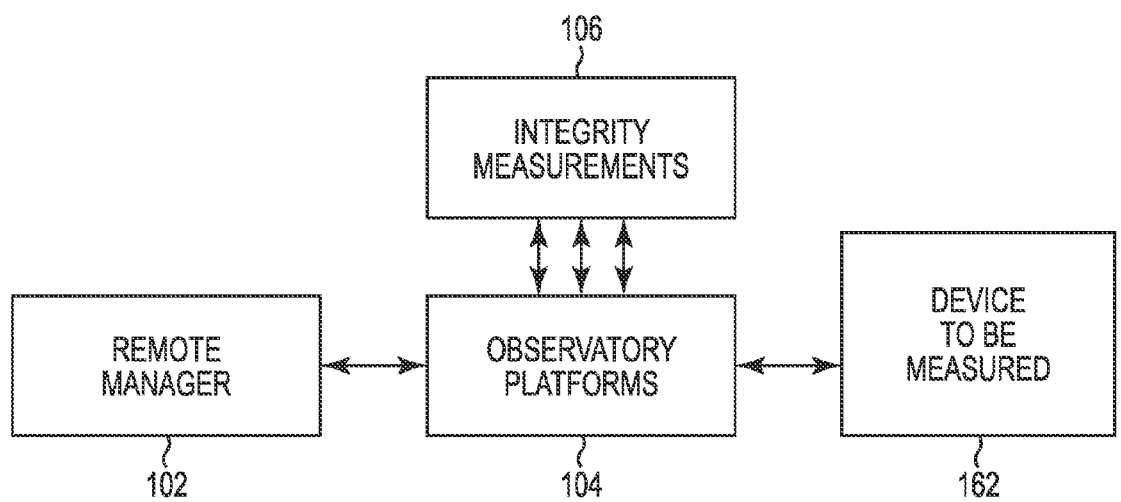
FIG. 1 illustrates a functional block diagram associated with measuring the integrity of a system in accordance with a number of embodiments of the present disclosure.

The present disclosure includes methods and systems for measuring the integrity of a device. A number of embodiments can include initiating an observatory in a system. A number of embodiments can also include initiating a remote manager. A number of embodiments can also include measuring the integrity of a device from the observatory and accessing the integrity measurement of the device from the remote manager.

A number of embodiments can include instructions stored on a computer-readable medium which are executed by a processor to determine the integrity of a computing apparatus as described herein. As an example, instructions stored on a computer-readable medium can be executed by a processor to initiate an observatory in a system. Instructions stored on a computer-readable medium can be executed by a processor to measure the integrity of a number of devices from the observatory. Instructions stored on a computer-readable medium can also be executed by a processor to determine an integrity level of a computing apparatus based on the measured integrity of the number of devices. A number of embodiments can provide benefits such as separating an integrity measurement associated with a particular device from an observatory platform from which the integrity is measured. Furthermore, a number of embodiments can provide an infrastructure that can allow multiple integrity measurements of a device to be made from a number of different observatories. Measuring the integrity of the computing apparatus from a number of different observatories provides benefits such as the ability to compare the different measurements, which can enhance a trust level associated with the integrity level of the computing apparatus. As used herein, the term "computing apparatus" may refer to a device and/or system. A device may refer to a component of a system. A system may refer to a computing system.

In previous approaches, monitors are executed as programs co-located on a host's processor. Co-location describes the measurement of the integrity of a device from or by the device itself. Co-locating provides the monitor with access to a variety of data sources. With adequate privileges, a system's state can be accessed. However, co-location may leave the monitor open to subversion from security threats on the system. If, for example, a basic input/output system (BIOS) is breached by malware, then measuring the integrity of the BIOS by the BIOS may provide incorrect measurements to the monitor.

An integrity level of a computing system can be determined based on a number of integrity measurements of its devices. As used herein, a measurement can describe the application of a stimulus to a device and the reading of the response that the stimulus causes in the device. For example, a memory device can be measured by activating a number of sense lines and/or access lines to apply a stimulus and reading data stored in the memory. As such, measuring a memory device can include reading data stored in the memory device. In a number of examples, the observatory provides the stimulus to the device such that the device does not measure itself even though the device's circuitry may be used to produce a response.

Integrity can be measured by comparing the state of a device and/or system to the expected state of that device and/or system. Differences identified in that comparison can indicate a change in the integrity of that device and/or system. The integrity level of a device and/or system can describe a degree to which a device and/or system has been compromised by faults or security issues, for instance. As used herein, the integrity level of a device and/or system describes the integrity level of hardware, software, and/or firmware that is associated with the device and/or system. The integrity level of a device and/or system can also indicate that different portions of the device and/or system are (or are not) functioning properly. The integrity level of a device and/or system also provides an indication regarding the trust of the integrity measurements associated with a device. As used herein, the integrity level of a device and/or system can refer to a qualitative and/or quantitative value that provides an indication regarding the integrity of the device and/or system. For example, the integrity level can be indicated via an assigned qualitative value such as "trustworthy" or "untrustworthy" and/or via an assigned integrity level of "high," "medium," "low," etc., which can provide an indication regarding whether, and/or the degree to which, the device and/or system can/should be trusted. In a number of examples, the integrity level can be indicated via a numerical scale (e.g., 1 to 10, 1 to 100). Embodiments are not limited to a particular type of integrity level indicator.

In the following detailed description of the present disclosure, reference is made to the accompanying drawings that form a part hereof, and in which are shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate the embodiments of the present invention, and should not be taken in a limiting sense. Also, as used herein "a number of" something can refer to one or more of such things.

Various embodiments of the present disclosure can be performed by execution of computer-readable instructions (CRI) (e.g., in the form of software and/or firmware), hardware, application modules, and the like, executable and/or resident on the tools, systems, and devices shown herein or otherwise. As used herein, a device refers to a component of a computing system that can include CRI, hardware, and/or application modules that can be targeted by malware. An observatory refers to CRI, hardware, and/or application modules executing on a device that can host CRI that can measure the integrity of a number of devices in a system. In a number of examples, an observatory and a device can be independent from each other and can reside in a same system (e.g., computer system). That is, CRI hosted on the observatory can measure the integrity of the number of devices without depending on the number of devices to perform the measurement.

Independence can include one or more of temporal, logical, and/or physical separations. A physical separation can include one or more of electrical, mechanical, and/or spatial separations. An example of temporal separation can occur when a specific device acts as an observatory to perform measurements on the number of devices, where those devices may be temporarily frozen, halted, and/or suspended, while the measurement occurs. An example of logical separation can occur when an observatory on a computing system is protected by features of the computing system underlying the part of the system being measured. An example of this is using a Trusted Execution Environment provided by a processor from which to perform the measurements. Physical separation can include physical separation between the observatory and the number of devices being measured. Physical separation can include one or more of spatial separation (e.g., physically distinct circuits in separate devices), mechanical separation (e.g., where the physically distinct circuits are on separate boards or separate systems), and/or electrical separation (e.g., where the physical distinct systems do not share electrical power or signals). In a number of examples, an electrical separation can include an observatory that is powered by a first power supply while a device that is being measured by the observatory is powered by a second power supply.

In a number of examples, the integrity level of a computing apparatus can be measured at an initial state of a system. For example, an integrity level of a computing apparatus can be measured subsequent to booting of a system (e.g., at and/or during boot time of a system). Integrity measurements of a state of a device provide knowledge of the integrity level of the computing apparatus at a time of measurement (e.g., boot time, for instance). As used herein, computing systems are dynamic systems that change states in association with the passage of time. As a result, the knowledge of the integrity level of a computing apparatus decays after an initial integrity of a system is measured. The rate of decay of the knowledge of the integrity level of a computing apparatus is proportional to the rate of unpredictable change of states of the system.

The rate at which information is lost is referred to as an entropic drag. In view of the entropic drag of a system, a measurement of a state of a system can be taken dynamically. Dynamic measurements of a state of a system can describe the measuring of a state of a system after an initial measurement of a state of a system is taken. Dynamic measurements can be taken at predefined intervals and/or based on one or more predefined events. Dynamic measurement of the integrity level of a computing apparatus in combination with the separation of the integrity measurements from the observatory platforms can provide accurate integrity measurements that are available after a system has experienced security issues such as successful malware attacks and/or failures.

FIG. 1 illustrates a functional block diagram associated with measuring the integrity of a system in accordance with a number of embodiments of the present disclosure. In the example shown in FIG. 1, a number of integrity measurements 106 of a target device 162 to be measured can be taken from observatory platforms 104. The measurements made by the observatory platforms can be retrieved by a remote manager 102 and can be used to measure the integrity of the system.

FIG. 1 shows a distinction between device 162 to be measured, the integrity measurements 106, the observatory platforms 104, and a remote manager 102 (e.g., remote system) that provides commands and controls the measuring of the integrity of a device 162. In a number of examples, a measurement of the integrity of a device 162 may be taken from a single observatory or a plurality of observatories.

Measuring the integrity of a device from a number of observatories (e.g., a number of vantage points) can provide sufficient information to attest to the integrity level of a computing apparatus. As used herein, attesting the integrity level of a computing apparatus refers to validating the integrity of a computing apparatus. Each measurement of the integrity of a device taken from a particular observatory can be associated with a level of uncertainty. Uncertainty in individual measurements can be attributed to the attack surface that each of the observatories can have to security threats. That is, each of the observatories may have suffered a successful attack and/or may have experienced failures which can affect the measurements of the integrity of a device. The uncertainty of combined measurements taken from a number of observatories decreases as the number of measurements taken from a number of observatories increases due to the ability to cross-check the number of measurements.

Figure 2:
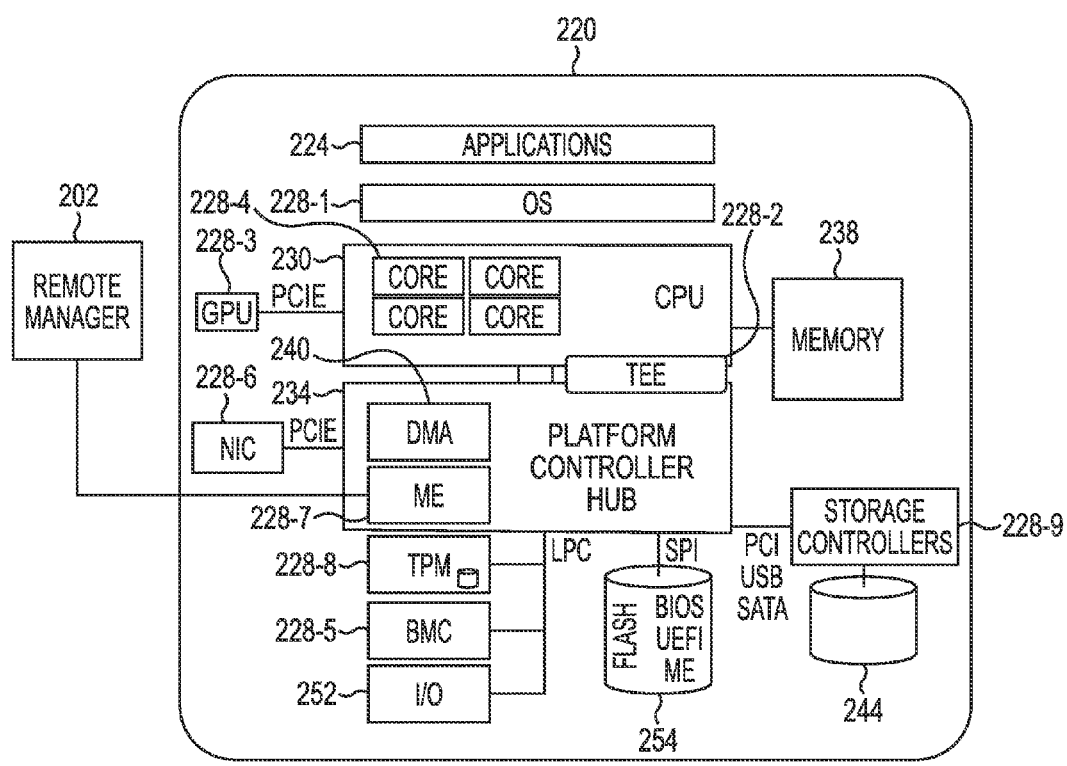
FIG. 2 illustrates a system for measuring the integrity of a device in accordance with a number of embodiments of the present disclosure.
Figure 3:
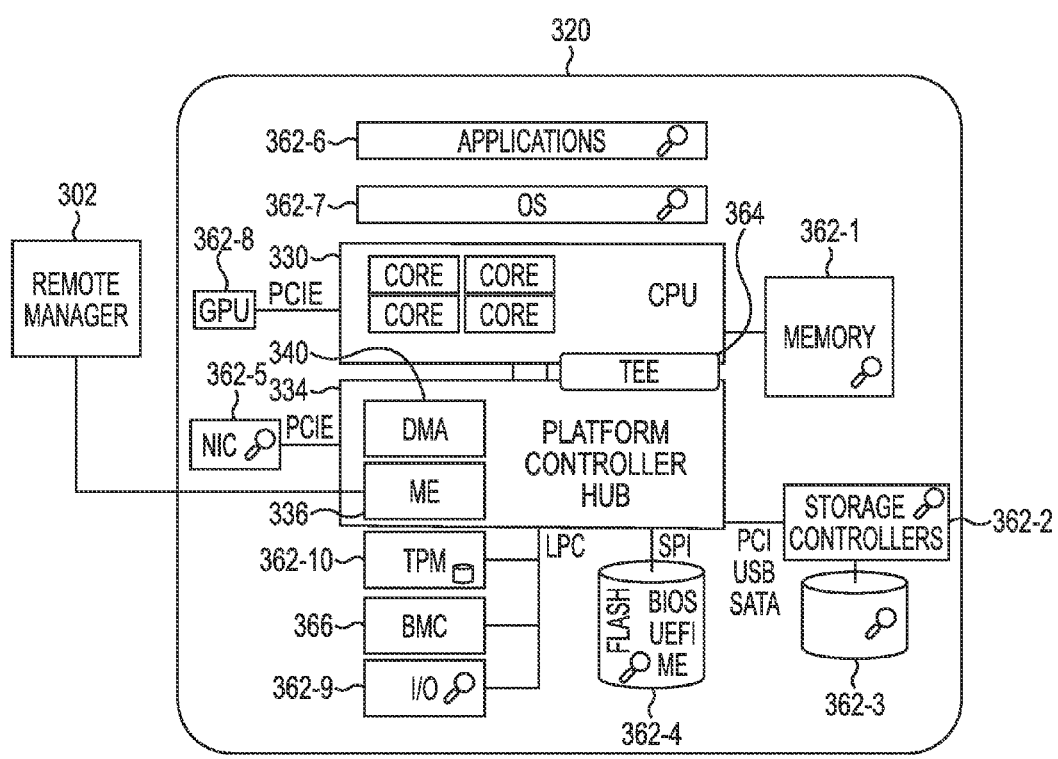
FIG. 3 illustrates a system for measuring the integrity of a device in accordance with a number of embodiments of the present disclosure.

FIGS. 2 and 3 provide examples of measuring 106 the integrity of a device from a number of observation platforms 104. FIG. 2 shows a number of observation platforms (e.g., referred to generally as observatories). FIG. 3 shows a number of devices that can be measured.

FIG. 2 illustrates a system 220 for measuring the integrity of a device in accordance with a number of embodiments of the present disclosure. The system 220 can include a CPU 230 with a number of processor cores, a platform controller hub 234, a memory 238, a direct memory access (DMA) module 240, storage device 244, flash 254, and an I/O module 252. The flash 254 can include a basic input/output system (BIOS), unified extensible firmware interface (UEFI), a management engine (ME), among other engines and/or modules that can be flashed into system 220. The system 220 also includes observatories 228-1, 228-2, 228-3, 228-4, 228-5, 228-6, 228-7, 228-8, and 228-9.

The system 200 can host an operating system (OS) (e.g., observatory 228-1) and/or an application 224 that can utilize a number of devices that comprise the system 220. In a number of examples, the system 220 can host a hypervisor, virtual machine, and/or application 224. As used in FIG. 2, memory 238 includes at least one of persistent memory, non-persistent memory, physical memory, virtual memory, internal memory, and/or external memory. Measuring the integrity of memory 238 can include measuring the integrity of the data stored in memory. For example, memory 238 can include an application 224 stored in memory and/or an operating system stored in memory.

The system 220 can be coupled to a remote manager 202 that can receive and/or retrieve a measurement of the integrity of a number of devices. A description of the devices that are measured is provided in FIG. 3.

A remote manager 202 is shown to be external and independent of system 220. In a number of examples, the remote manager 202 can be local to system 220. That is, the remote manager 202 can be integrated into system 220. A remote manager 202 that is independent of system 220 can provide added security by being on a different system that system 220 which may have security issues.

In FIG. 2, the observatories can include an OS (e.g., observatory 228-1), a TEE module (e.g., observatory 228-2), a Graphics Processing Unit (GPU) (e.g., observatory 228-3), a core in CPU 230 (e.g., observatory 228-4), a baseboard management controller (BMC) (e.g., observatory 228-5), a network interface card (NIC) (e.g., observatory 228-6), a management engine (ME) (e.g., observatory 228-7), a trusted platform module (TPM) (e.g., observatory 228-8), and/or a storage controller 228-9 among other possible observatories. The OS 228-1, the TEE module 228-2, the GPU 228-3, the core 228-4, the BMC 228-5, the NIC 228-6, the ME 228-7, the TPM 228-8, and/or the storage controller 228-9 can be referred to herein as observatories 228. In a number of examples, the observatories 228 can also include an integrated debug framework that can be integrated into a processing resource. The observatories 228 can be instrumented and/or repurposed to measure the integrity of a number of devices. The observatories 228 can have resources (e.g., memory, processing resource) and/or can have access to other devices resources that can enable the observatories 228 to measure aspects of a number of devices in system 220.

Instrumenting an observatory can include adding a number of CRI to already existing CRI. For example, the OS 228-1 can be instrumented by adding CRI to the OS 228-1 that provide the OS 228-1 with the ability to measure the integrity of a device. The OS can monitor data structures for unintended and/or unauthorized changes to measure the integrity of a device, for example. A benefit of instrumenting the OS 228-1 to measure the integrity of a device is that the OS 228-1 can have visibility into the entire system 220.

Figure 5:
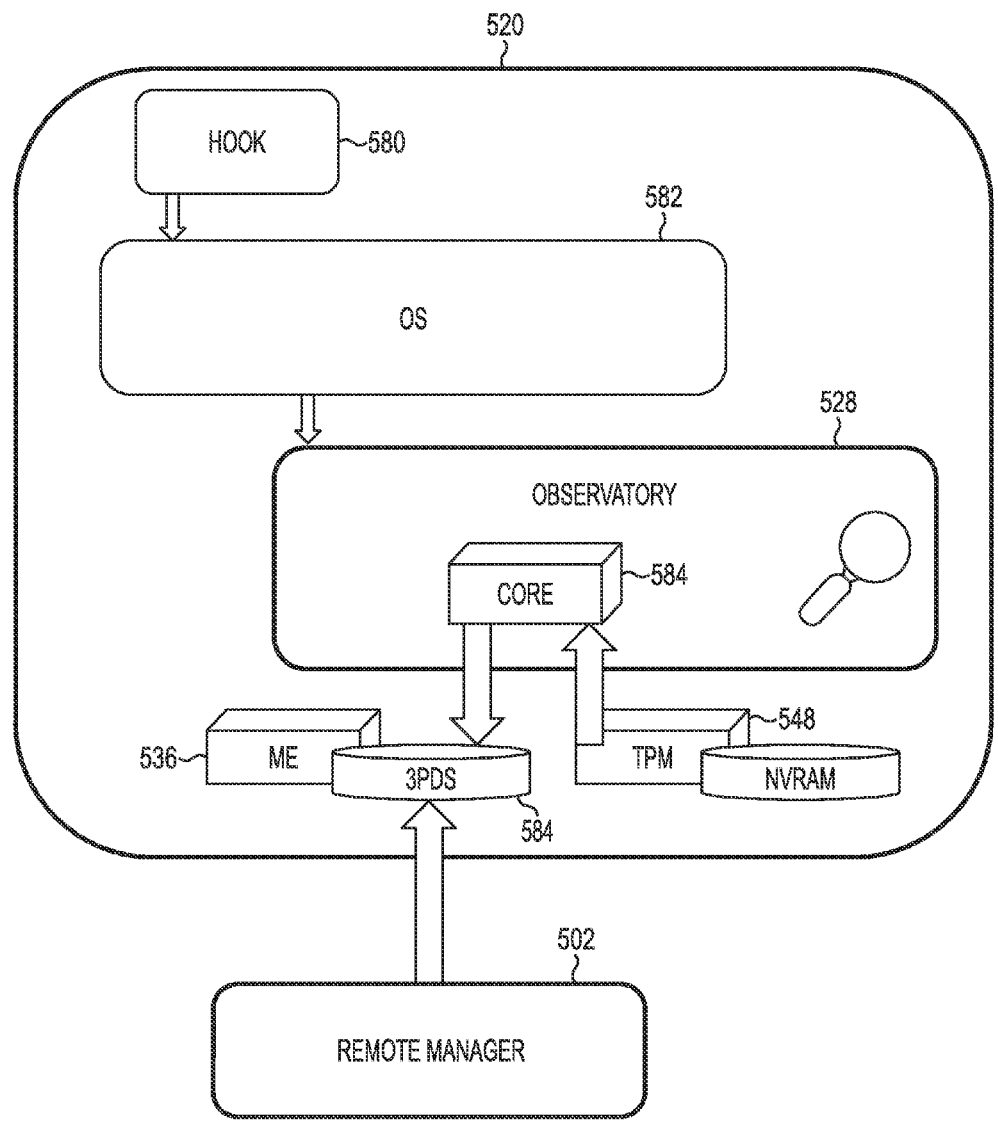
FIG. 5 illustrates a functional block diagram of an example of measuring the integrity of a device in accordance with a number of embodiments of the present disclosure.

Furthermore, the source code of the OS 228-1 may be open and it may be hardware independent. In a number of examples, measuring the integrity of a device and determining an integrity level of a computing apparatus (e.g., system 220 and/or devices) can include comparing what the system 220 measures its own state to what an observatory(s) 228 determines is the internal state of the system 220. A computing apparatus can include a number of systems each including a number of devices as shown in FIG. 5.

The TEE module 228-2 can include microcode and/or firmware that supports an environment for partitioning memory, and executing signed instructions in a secure environment. That is, the TEE module 228-2 can support software and hardware trusted execution. The TEE module 228-2 can be instrumented and/or repurposed to measure the integrity of device. Repurposing the observatories 228 can include replacing a number of old instructions with a number of new instructions that provide the ability to measure the integrity of a device. For example, the TEE module 228-2 can be repurposed by flashing in the number of new instructions that provide the ability to initiate a trusted execution environment and/or measure the integrity of a device.

The GPU 228-3 can include a processor that is coupled to the system 220 via a peripheral component interconnect express (PCIe) or other device communication interface. In a number of examples, the observatories 228 can access and analyze internal devices of the system 220. For example, the GPU 228-3 can utilize the DMA module 240 to access and analyze the memory 238 to measure the integrity of a device.

The core 228-4 can be a core in processor 230. The core 228-4 can execute instructions to measure the integrity of a device.

The BMC 228-5 is an independent hardware subsystem that facilitates remote management. The BMC 228-5 can be repurposed and/or augmented with additional functionality to measure the integrity of the device. The BMC 228-5 can also be repurposed to provide out-of-band command and control and telemetry. The BMC 228-5 and/or other observatories can be repurposed by replacing an old image with a new image that is flashed onto the BMC 228-5 and/or other observatories. The new image can be created by dividing an old image provided by the manufacturer into file types. The file system archives can be identified and updated to build the new image.

The NIC 228-6 is an network interface card that can be internal to system 220 and/or external to system 220. The NIC 228-6 can be repurposed and/or augmented with additional functionality to measure the integrity of a device.

The ME 228-7 can include hardware and/or firmware for remote out-of-band management of the device 220. The ME 228-7 can be repurposed and/or augmented with additional functionality to measure the integrity of a device.

The TPM 228-8 is a dedicated microprocessor designed to secure hardware by integrating cryptographic keys into a device. The TPM 228-8 can be repurposed and/or augmented with additional functionality to measure the integrity of a device.

The storage controller 228-9 can include a firmware and/or hardware that interfaces with storage devices 224 to couple the storage device 224 to the system 220. The storage controller 228-9 can also be repurposed and/or augmented with additional functionality to measure the integrity of a device.

The new image can be flashed by using the manufacturer's firmware update tools to install the new image. In a number of examples, the manufacturer's installer can be used to load the new image.

FIG. 3 illustrates a system 320 for measuring the integrity of a device in accordance with a number of embodiments of the present disclosure. The system 320 includes a TEE 364 which is analogous to TEE 228-2 in FIG. 2. The TEE 364 in FIG. 3 has a different reference number than the TEE 228-2 in FIG. 2 due to the different characteristics of the TEE that are called out in FIG. 2 and in FIG. 3. For example, FIG. 2 describes the TEE 228-2 as an observatory. FIG. 3, describes the TEE 364 as a device.

System 320 also includes a CPU 330, a platform controller hub 334, an ME 336, a DMA 340, and a BMC 366, that are analogous to the CPU 230, a platform controller hub 234, ME 228-7, a DMA 240, and a BMC 228-5, in FIG. 2, respectively. System 320 also includes a memory (e.g., a device 362-1), a storage controller (a device 362-2), a storage device (e.g., a device 362-3), flash (e.g., a device 362-4), a NIC (e.g., a device 362-5), an application (e.g., a device 362-6), an OS (e.g., a device 362-7), a GPU (362-8), an I/O module (e.g., a device 362-9) (e.g., referred to as devices 362), and/or TPM 362-10 that are analogous to a memory 238, a storage controller 228-9, a storage device 244, a flash 254, a NIC 228-6, an application 224, a OS 228-1, a GPU 228-3, an I/O module 252, and/or TPM 228-8 in FIG. 2.

System 320 shows a plurality of devices. The designation of devices 362 provides examples of devices that can be measured. The designation of devices 362 does not limit the applicability of the term device 362 to devices not shown in FIG. 3 and/or to devices not designated as devices 362 in FIG. 3. For example, the devices 362 can also include peripheral component interconnect (PCI) devices and/or universal serial bus (USB) devices.

In a number of examples, a device can function as a device 362 at a first time and as an observatory at a second time. A device is not a device 362 and an observatory at a same time. An observatory is independent of a device 362. A device 362 can be measured to determine the integrity of the device 362 at a first time and the device 362 can be used as an observatory to measure the integrity of a different device at a second time.

The integrity of a device can be measured subsequent to booting the device (e.g., boot time) and/or dynamically after booting the device. The integrity measurements of devices 362 can be used to determine an integrity level of the computing system 320.

Measuring the integrity of the devices 362 at boot time can include connecting the remote manager 302 to the ME 336 and reading a hardware asset inventory that the ME 336 provides. The hardware asset inventory can include an inventory of the devices that are included in system 320 and/or that are coupled to system 320. The hardware asset inventory can be created at a commissioning of the system 320 and/or at a later time of operation of the system 320.

In a number of examples, if the hardware asset inventory is consistent with the devices that are currently included in the system 320 and/or that are coupled to system 320, then a more detailed measurement of the integrity of the devices 362 can be performed. If the hardware asset inventory is inconsistent with the devices that are currently included in the system 320 and/or that are coupled to system 320, then a more detailed measurement of the integrity of the device 362 can be halted for a later time.

In a number of examples, if the hardware asset inventory is inconsistent with the devices that are currently included in the system 320 and/or that are coupled to system 320, then a more detailed measurement of the integrity of the device 362 can be performed. If the hardware asset inventory is consistent with the devices that are currently included in the system 320 and/or that are coupled to system 320, then a more detailed measurement of the integrity of the device 362 can be performed at a later time upon which the hardware asset inventory becomes inconsistent with the devices that are included in system 320 and/or that are coupled to system 320. The type of measurements included in the more detailed measurement of the integrity of the devices 362 can be dependent on whether the more detailed measurements are executed if the hardware asset inventory is consistent or inconsistent with the devices that are currently included in the system 320 and/or that are coupled to system 320.

For example, a more detailed measurement of the integrity of the devices 362 can include inspecting a boot module 362-4, the devices 362 details, and/or read only memorys (ROMs) (e.g., Option ROMs). The more detailed measurement of the integrity of the devices 362 can be performed by performing an integrated drive electronics redirection (IDE-R) boot over a network and serving a custom image to the system 320. The custom image can be referred to as a stage-1 boot image.

The stage-1 boot image can be used to measure the integrity of the devices 362. The measurement functionality of the stage-1 boot image can reside in the ME 336 and may not require a reboot or the extra time for the network load. The stage-1 boot image can provide a flexible approach to performing detailed boot-time inspection and mitigation of identified issues.

A number of tools can be used to identify changes to the flash 362-4 acting as a boot module. The identified changes can include minor (e.g., single-bit) boot module configuration changes.

The stage1-boot image can also be used to inspect device option ROMs for PCI devices, GPU 362-8, and/or storage device 362-3, among other devices. A hash of the ROM contents can be stored into third party data stores (3PDS). If unapproved changes are detected, then the device 362 can be re-flashed to a previously approved state.

In a number of examples, a number of user configuration parameters can be stored for all the ROMs used by devices (e.g., driver controllers, ethernet, video, and/or sound cards, among other devices). User configuration parameters can also include areas of the boot module that are stored within a first number of bits of physical memory. For example, the user configuration parameters can include areas of the boot module that are stored within the first 1024 Kb of physical memory.

The stage-1 boot image also provides a platform from which storage devices 362-3 can be inspected to measure the integrity of the storage devices 362-3. In addition to detecting unexpected media (e.g., new disks or USB thumb drives, for example), the MBR and partitions on the storage device 362-3 can be measured. If the MBR has changed from a previous authorized state without authorization, then the MBR can be restored to an approved state before launching into the encrypted OS.

The measurement of the integrity of devices 362 can be protected by programming the ME to inhibit network traffic to and/or from the system 320 from the build-in NIC 362-5. The protection can prevent attacks over a network connection that could compromise the initial machine-level integrity checks. Although the system 320 may be off the network, the remote manager 302 can communicate directly with the ME, via the 3PDS on the system 320. The 3PDSs can be non-volatile RAM (NVRAM) under the control of the ME 336. The ME 336 and the 3PDS can be used as the remote access trusted path during the measuring of the integrity of devices 362 subsequent to booting the device and/or dynamically after booting the device.

The remote manger 302 can retrieve the integrity measurements stored in the 3PDS. The remote manager 302 can also determine an integrity level of the computing apparatus (e.g., system 320 and/or devices 362) based on the integrity measurements of the device. If unacceptable hardware changes are identified during the boot process, then manual or automated remediation may be implemented that can include restricting unacceptable devices, rewriting compromised flash memories, and/or rewriting the disk images.

Figure 4:
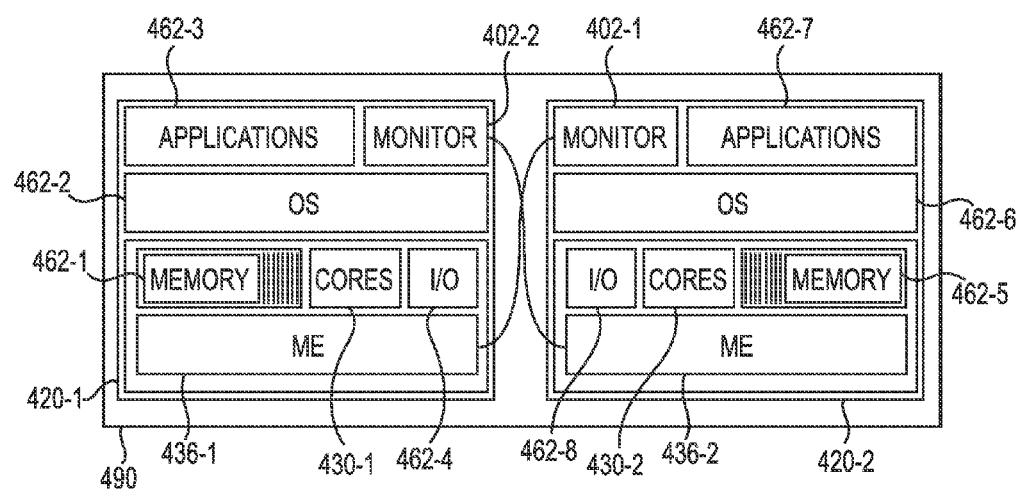
FIG. 4 illustrates a number of systems for measuring the integrity of a number of devices in accordance with a number of embodiments of the present disclosure.

FIG. 4 illustrates a number of systems for measuring the integrity of a number of devices in accordance with a number of embodiments of the present disclosure. FIG. 4 includes systems 420-1 and 420-2. FIG. 4 also includes memory (e.g., devices 462-1 and 462-5), OSs (e.g., devices 462-2 and 462-6), applications (e.g., devices 462-3 and 462-7), and I/O modules (e.g., devices 462-4 and 462-8) which are analogous to memory 362-1, OS 362-7, applications 362-6, and I/O module 362-9 in FIG. 3. FIG. 4 also includes cores 430-1 and 430-2, monitors 402-1 and 402-2, and ME 436-1 and 436-2 which are analogous to core 330, manager 302, and ME 336 in FIG. 3.

The system 420-1 includes monitor 402-2, core 430-1, ME 436-1, device 462-1, device 462-2, applications 462-3, and device 462-4. System 420-2 includes monitor 402-1, core 430-2, ME 436-1, device 462-5, device 462-6, device 462-7, and device 462-8.

A number of integrity measurements of a target device to be measured can be taken from observatory platform. The measurements can be stored in an ME. The measurements can be retrieved by a remote manager and can be used to measure the integrity of the system.

For example, an integrity measurement of devices 462-1, 462-2, 462-3, 462-4 can be taken from an observatory in system 420-1. The measurements can be stored in ME 436-1. The measurements can be retrieved from ME 436-1 by monitor 402-2 which is external to system 420-1. An integrity measurement of devices 462-5, 462-6, 462-7, 462-8 can be taken from an observatory in system 420-2. The measurements can be stored in ME 436-2. The measurements can be retrieved from ME 436-2 by monitor 402-1 which is external to system 420-2.

That is, the computing apparatus 490 comprises a number of systems 420-1 and 420-2, with each hosting the remote manager 402-1 and 402-2 that retrieves integrity measurements from one of the other systems. The figure shows an example with two systems, although more are possible. System 420-1 hosts the remote manager 402-2 that retrieves integrity measurements from system 420-2 and system 420-2 hosts the remote manager 402-1 that retrieves integrity measurements from system 420-1. This configuration enables the systems 420-1 and 420-2 to cross check each other in identifying and addressing security issues, threats, and/or failures.

FIG. 5 illustrates a functional block diagram of an example of measuring the integrity of a device in accordance with a number of embodiments of the present disclosure. FIG. 5 includes a system 520, a hook 580, an operating system (OS) 582, an observatory 528, a core 584, an ME 536, a TPM 548, and/or a RM 502. FIG. 5 provides an example of dynamically measuring the integrity of a device and determining an integrity level of a computing apparatus. The measuring of the integrity of a device is referred to as dynamic in FIG. 5 as a result of being performed after the booting of the device.

As used herein, a computing engine can include hardware firmware, logic, and/or executable instructions, but includes at least hardware (e.g., a processor, transistor logic, application specific integrated circuit (ASIC), etc.) executing instructions to perform particular actions, tasks and functions described in more detail herein. For example, a compute engine can include at least an initiation engine, a measuring engine, a determination engine, a remote manager engine, and a privileges engine.

Dynamically measuring the integrity of a device can include enabling a single core 584 and disabling other cores and disabling a DMA to reduce the available attack surface to malware. In a number of examples, dynamically measuring the integrity of a device can include halting the system 520 to limit the options for malware to interfere with the outcome of the measuring process.

Dynamically measuring the integrity of a device can include initiating at least one observatory to measure the integrity of the device. The measuring can be initiated via an initiation engine. The initiation engine can be a hook, for example. A hook describes instructions that are included and/or associated with an application, an operating system 582, firmware, and/or hardware, such as a timer, and that initiate the measuring of the integrity of a device and/or system. For example, the hook can be implemented in any of the observatories 228 in FIG. 2. The hook can initiate the measuring by initiating an observatory 428. The hook can initiate the measuring based on a predetermined time interval. For example, the hook can initiate the measuring at sub-second, seconds, minutes, or hourly time intervals, among other possible time intervals. The hook can initiate measuring the device based on the occurrence of an event such as the reception of network traffic. The hook can also initiate measuring the device based on different events that can be associated with the possibility of a security threat. The hook can also initiate measuring the device based on different events that can be associated with the need to assess integrity, (e.g., before launching a critical application).

The hook 580 can be implemented using a root access and/or super user access in the OS 582 to invoke and/or initiate an observatory 528. For example, the hook 580 can invoke the TEE module, a GPU, a boot module, and/or a different observatory. A privileges engine can provide a number of privileges to observatory 528 (e.g., a number of observatories) to measure the integrity of the device. Although FIG. 5 shows a single observatory 528, a number of observatories can provide a number of instructions that measure the integrity of the device.

The observatory 528 can initiate a trusted execution environment. For example, the TEE module can initiate a trusted execution environment. Initiating a trusted execution environment can include stopping the processors, the interrupt handlers, and/or deactivating direct memory access. Deactivating direct memory access can include preventing periphery devices from accessing memory. In a number of examples, all the processors can be deactivated and core processor 584 can be activated or all the processors can be deactivated with the exception of the core processor 584.

The observatory 528 can provide a set of instructions that measure the integrity of the device to the TPM 548 to determine whether the set of instructions that measure the integrity of the device and/or system 528 have been modified without authorization. The instructions can be modified without authorization if a security threat has altered the instructions. The TPM 548 can perform a cryptographic check to determine whether the set of instructions have been modified without authorization.

If the set of instructions have not been modified without authorization, then a measuring engine can initiate execution of the instructions that measure the integrity of the device via a core processor 584. In a number of examples, the measuring engine can initiate execution of the instructions that measure the integrity of the device via a non-core processor such as the GPU.

The executed instructions that measure the integrity of the device can analyze and/or measure physical memory, registers, and/or devices, among other devices that can be analyzed. The observatory 528, via the core processor, 584 can bundle the integrity measurements of the device in a package. The observatory 528 can cryptographically sign the package. The observatory 528 can cryptographically sign the package using the TPM 548, for example. Cryptographically signing the results of the integrity measurement using the TPM 548 can provide confidence to the remote manager 502 that the results have not been altered by malware.

The observatory 528 can place the cryptographically signed package including the integrity measurements of the device into the 3PDS 584. The 3PDS 584 can be flash memory in the system 580. After the cryptographically signed package is stored in the 3PDS 584, then the observatory 528 can allow the system 520 to return to a previous state of execution that is not associated with measuring the integrity of the device.

A remote manager engine can retrieve the results of the measurement from the 3PDS 584 via the ME 536. The remote manager engine can utilize the remote manager 502 retrieve and/or receive the results of the measurement. A determination engine can determine, via the remote manager 502, whether the results of the measurement have been altered by malware by inspecting the cryptographic signature associated with the results of the measurement. Independent of the results of the measurement, the cryptographic signature can be used to determine an integrity level of the computing apparatus.

For example, if the cryptographic signature is not an expected cryptographic signature, then the remote manager 502 can determine that a security threat exists in system 520. If the results of the integrity measurements are deleted and/or not present, then the remote manager 502 can determine that a security threat exists in system 520. For example, malware may have tampered with the results of the measurements and/or the measurement did not take place due to unauthorized changes to system 520. If the results of the measurement are saved to the 3PDS 584 and the cryptographic signature is as expected, then the integrity measurement of the device can be augmented.

A determination engine, via remote manager 502, can utilize the integrity measurements of the device(s) to determine an integrity level of the computing apparatus. That is, a number of integrity measurements of a single device can be used to determine an integrity level of the computing apparatus and/or a number of integrity measurements of a number of devices can be used to determine an integrity level of the computing apparatus.

CONCLUSION

The present disclosure includes methods and systems for measuring the integrity of a device and/or system. A number of embodiments can include a number of observatories that can measure the integrity of a device in a trusted execution environment. A number of embodiments can also include a remote manager that can retrieve the measurements and determine an integrity level of a computing apparatus based on the measurements of the integrity of the device.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of a number of associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the number of embodiments of the present disclosure includes other applications in which the above structures and methods are used. Therefore, the scope of the number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer implemented method for measuring an integrity level of a computing apparatus, the method comprising:
   initiating an observatory in a first component of the computing apparatus, wherein the computing apparatus comprises a plurality of components;
   initiating a remote manager external to the plurality of components;
   obtaining an integrity measurement of a different component of the computing apparatus from the initiated observatory; and
   accessing the integrity measurement of the different component from the remote manager; and wherein initiating the observatory in the first component comprises repurposing the first component to serve as the observatory in addition to a primary purpose of the first component.

2. The method of claim 1, wherein the initiated observatory measures the integrity of the different component without depending on the different component to perform the measurement itself.

3. The method of claim 1, further comprising instrumenting the observatory by adding a number of instructions to already existing instructions stored in the observatory such that the observatory can obtain integrity measurements of components other than the different component.

4. The method of claim 1, wherein the first component in which the observatory is executed and the different component are physically separate components in the computing apparatus.

5. The method of claim 1, wherein each of the plurality of integrity measurements accessed from the remote manager has an associated level of uncertainty determined based on an attack surface to security threats.

6. The method of claim 1, wherein the integrity measurement is one of a plurality of integrity measurements accessed from the remote manager, the plurality of integrity measurements including at least two integrity measurements of a particular component of the computing apparatus taken from observatories initiated in at least two components of the computing apparatus other than the particular component; and
wherein the plurality of integrity measurements accessed from the remote manager are used to determine an integrity level for the computing apparatus.

7. A computer-readable medium having instructions stored thereon that are executed by a processor to:
initiate an observatory in a number of components of a computing apparatus comprising a plurality of components;
initiate a trusted execution environment of the computing apparatus;
perform, from a first initiated observatory within the computing apparatus, an integrity measurement of at least one of the plurality of components;
perform, from a second initiated observatory within the computing apparatus, an integrity measurement of the at least one of the plurality of components; and
determine an integrity level of the computing apparatus based on the integrity measurements of the at least one of the plurality of components; and
wherein initiating the observatory in the number of components comprises repurposing the number of components to serve as the observatory in addition to a primary purpose of the number of components.

8. The computer-readable medium of claim 7, including instructions executable to:
determine that a problem exists based on the integrity level of the computing apparatus; and
resolve the problem.

9. The computer-readable medium of claim 8, wherein the integrity measurements of the at least one of the plurality of components are stored in a third party data store to be retrieved by a remote manager.

10. The computer readable-medium of claim 8, including instructions executable to:
retrieve the integrity measurements of the at least one of the plurality of components; and
verify a cryptographic signature associated with the integrity measurements of the at least one of the plurality of components.

11. The computer-readable medium of claim 7, wherein at least one of the first and second initiated observatories is at least one of a board management controller, an operating system (OS), a graphics processing unit (GPU), a trusted platform module, and a boot module.

12. The computer-readable medium of claim 7, wherein the at least one of the plurality of components is at least one of a storage controller, a device controller, a device connected through a controller, a storage media, a memory, and an OS.

13. The computer-readable medium of claim 7, wherein initiating the trusted execution environment includes deactivating:
several processors;
an interrupt handler; and
direct memory access.

14. A system for determining an integrity level of a computing apparatus, comprising:
an initiation engine to:
initiate an observatory in each component of a group of components of a computing apparatus;
initiate a trusted execution environment of the computing apparatus;
wherein initiating the observatory in each component of the group of components comprises repurposing each component of the group of components to serve as the observatory in addition to a primary purpose of each component of the group of components;
a measuring engine to provide, from a plurality of the initiated observatories, a respective plurality of integrity measurements of a particular component of the computing apparatus, wherein each one of the plurality of integrity measurements has an associated uncertainty level; and
a determination engine to determine an integrity level of the computing apparatus based on the plurality of integrity measurements of the particular component taken from the plurality of initiated observatories and their associated uncertainty levels.

15. The system of claim 14, further comprising a management engine to monitor the computing apparatus and access the plurality of integrity measurements.

16. The system of claim 15, wherein the management engine is executed on the computing apparatus that the management engine is monitoring.

17. The system of claim 15, wherein the management engine is executed on a different computing apparatus that is being measured by a number of different observatories in the different computing apparatus.

18. The system of claim 14, wherein the integrity level of the computing apparatus is based on a comparison of the plurality of integrity measurements of the particular component cross-checked against each other, and wherein the uncertainty levels corresponding to the respective plurality of integrity measurements are based, at least partially, on an attack surface to security threats of the initiated observatories.

19. The system of claim 14, wherein the initiation engine is configured to initiate an observatory in each one of:
a core of a processor;
a memory device coupled to the processor; and
a network interface card.

* * * * *